United States Patent [19]

McRae et al.

[11] Patent Number: 4,888,730

[45] Date of Patent: Dec. 19, 1989

[54] MEMORY TYPEWRITER WITH COUNT OF OVERUSED WORDS

[75] Inventors: Doris J. McRae, Danbury, Conn.; Richard E. Roberts, Cortland, N.Y.

[73] Assignee: Smith Corona Corporation, Cortland, N.Y.

[21] Appl. No.: 141,032

[22] Filed: Jan. 5, 1988

[51] Int. Cl.[4] .......................... B41J 5/08; G06F 3/09
[52] U.S. Cl. .................... 364/900; 364/943.42; 364/942.7; 364/419; 400/63; 400/705.2
[58] Field of Search .............. 364/419, 200 MS File, 364/900 MS File, 300, 705.2, 63

[56] References Cited

U.S. PATENT DOCUMENTS 4,655,620  4/1987  Adams ............................. 364/900
4,783,803  11/1988  Baker .............................. 381/42

OTHER PUBLICATIONS

"Software Tools for Writers", by Wayne Holder, *Byte* Publications, Jul. 1982, pages including 138, 142, 144, 146, 150, 152, 154, 158, 160 & 163.

*Primary Examiner*—Lawrence E. Anderson

[57] ABSTRACT

A memory typewriter having an editable text stored in the memory together with a full-page correction buffer and individual counters associated with each differentiable word in the text. The combination permits determination and display of the most frequently used words in an edited text in order of descending frequency. Preferably, the combination includes a thesaurus list so that the typist can be altered if a frequently-used word in the display is also present in the thesaurus list. If so, the typist can then call for display of related synonyms by pressing or appropriate key controls and decide which of the synonyms, if any, to enter as replacement for the overused word.

12 Claims, 3 Drawing Sheets

FIG 2

MEMORY TYPEWRITER WITH COUNT OF OVERUSED WORDS

CROSS REFERENCE TO RELATED APPLICATIONS

The present invention is an improvement on the electronic typewriter disclosed in:

(I) U.S. Pat. No. 4,783,761 titled "SPELLING-CHECK DICTIONARY WITH EARLY ERROR SIGNAL," and issued Nov. 8, 1988 to R. W. Gray et al, (II) U.S. Pat. No. 4,807,181 titled "DICTIONARY MEMORY WITH VISUAL SCANNING FROM SELECTABLE STARTING POINT," and issued Feb. 21, 1989 to Howard C. Duncan IV et al, (III) U.S. Pat. No. 4,797,855 issued to Howard C. Duncan IV et al on Jan. 10, 1989 titled "ADAPTIVE SPELLING CORRECTOR,"

(IV) Application No. 000,698 filed by Howard C. Duncan IV on Jan. 6, 1987 and titled "AUTO RE-ALIGNED PRINT CORRECTION,"

(V) U.S. Pat. No. 4,655,620 issued to Donald T. Adams et al on Apr. 7, 1987 and titled "SPELLING ERROR FINDING FEATURE INCLUDING AN ELECTRONIC SPELLING DICTIONARY,"

(VI) Application No. 07/141,031, now U.S. Pat. No. 4,847,766, filed by Richard E. Roberts and Doris J. McRae on even date herewith and titled "DICTIONARY TYPEWRITER WITH CORRECTION OF COMMONLY CONFUSED," and lastly, (VII) Application No. 07/141,247 filed by Raymond A. Blanchard, Jr. and Richard E. Roberts Jan. 6, 1988 and titled "THESAURUS FEATURE FOR AN ELECTRONIC TYPEWRITER."

Note that all seven applications/patents are assigned to the present assignee and that for convenience and brevity they will be referred to by the above-shown Roman numerals when cited in the specification. Material in the foregoing applications/patents which is relevant to the present invention is hereby incorporated by reference.

FIELD OF THE INVENTION

The invention relates to "memory" typewriters (as they are sometimes called), which incorporate the capability of editing stored text by modifying, relocating, deleting, or otherwise changing one or more words of that text. More particularly, it relates to those discerning presence of overused words by providing information as to frequency of use of each word in a body of textual material. Furthermore, it also relates to those storing lists of words (e.g., a thesaurus) to which reference can be made for purposes of replacing an overused word.

BACKGROUND

Correcting typewriters have long been known which can remove incorrect characters and allow entry of correct ones by following an appropriate sequence of keystrokes (e.g., U.S. Pat. No. 3,780,846 entitled "Automatic Erasing Typewriter" and filed by Robert A. Kolpek et al, issuing on Oct. 9, 1973).

Subsequently, "Dictionary" typewriters have appeared on the market which contain a multi-word listing of correctly-spelled words stored in a read-only section of an electronic memory. An error detection unit emits a warning signal when an entered word does not compare with any word stored in the "dictionary" list. More powerful versions of these typewriters having an associated display unit provided search techniques (including statistically-governed types based on the nature of the typist's most frequently committed spelling errors) to find and display successive, properly-spelled "trial" words, one of these trial words then being selectable to replace the incorrect word.

Since that time, the market has likewise seen the advent of electronic typewriters with memories storing thesauri from which a typist can select one of a succession of synonyms and retrieve it for replacement of a word used imprecisely or in an erroneous context.

While the foregoing improvements did much to enhance the quality of communications prepared by poor spellers, dull writers, etc., there still has been the problem of determining over use of words without reliance on laborious manual counts or, conversely, without utilization of high-powered computer equipment, assuming the typewriter's system output was compatible with the input requirements of that equipment. This latter approach is achieved, however, with equivalent addition of considerable memory capacity devoted to programming and storage of the identified overused words. Thus, there is need for a simple, low-cost yet highly-efficient system discerning presence of overused words and providing information as to frequency of their use. In particular, it should be applicable to each differentiable word in edited text stored in the memory unit of electronic typewriters of the consumer type having limited display and memory capacity. Most importantly, the system should be adaptable with multiple use of existing memory and control elements, expansion of capacity with respect to these being minimized to the fullest extent possible.

SUMMARY OF THE INVENTION

A word-processing system having a memory, character, format and control data input to the system through a keyboard with a plurality of alphanumeric and function keys depressible by an operator, and a display; in combination with at least one discrete file of editable text stored within the memory, the file containing a plurality of differentiable words; a correction buffer in the memory normally storing data entered through the keyboard, the correction buffer having a capacity corresponding to a full page of characters; a first control responsive to pressing a discrete one of the depressible keys, the first control causing the file to be read word-by-word and each differentiable word to be stored in the correction buffer in association with a respective count element therein; incrementing means for augmenting a count in a respective count element therein, means for comparing each word read in the file with all words stored in the correction buffer, the means for comparing being effective to activate the incrementing means with respect to a given count element in response to an identity between a word read in the file and the word in the correction buffer associated with the given count element.

According to a further feature of the invention, a character counter is included for purposes of determining the number of characters (length) of the word read from editable memory. That number is then stored in the Correction Buffer adjacent the related word. Thereafter, that number is used to screen out any words from the text of length different from that of the word in the Correction Buffer and thus automatically eliminated in terms of identity, significantly reducing time spent on successive comparisons.

Accordingly, it is an object of the invention to provide an improved memory typewriter having fast, efficient detection, display and proper guidance for replacement of the most frequently overused words in text stored in editable memory.

It is a further object of the invention to provide a memory typewriter having a full page correction buffer register utilizable in determining the frequency of usage of each word stored in a selected file of editable memory.

Moreover, it is yet another object of the invention to provide for indication as to which of the overused words are available in an associated Thesaurus listing.

Other objects and features of the invention will become evident from a reading of the ensuing description taken in conjunction with the drawing.

BRIEF DESCRIPTION OF THE DRAWING

FIG. 1 is basically similar to identically-numbered figures in the above-cited applications termed References I to III hereinafter. Note that reference numerals are generally the same for like elements in the main figures of all the cited applications but where elements are specific to the present invention or have been modified for purposes thereof, the reference numerals are three digits long and begin with the number 900.

DESCRIPTION OF THE PREFERRED EMBODIMENT

The invention may be applied to what may be broadly termed an interactive word information processing system 10 in the form of a single unit such as a "memory" typewriter 10 (or electronic correcting typewriter as it is also termed). According to the block diagram of FIG. 1, System 10 has four principal units: a Keyboard 12, a Printer 14, a Display 16, and an Electronic Control Circuit 11 (encircled by dashed lines), in which—according to the invention—a "Word Counter" Feature 900 (an adjunct bounded by dot-dash lines at left in FIG. 1) is incorporated. As seen, "Word Counter" Feature 900 (referred to hereinafter as "COUNT" Feature 900) comprises a COUNT Control 902 and, preferably, a Thesaurus List 904 (this last containing some 96,000 root words and at least one synonym for each).

As will be described shortly, COUNT Control 902 is primarily concerned with determining whether any words stored in an Editable Memory 842 (which occupies part of a RAM or Random Access Memory 954) were overused. As may be mentioned here, RAM 954 differs somewhat from the random access memory of References I-V, being here a single static RAM IC unit providing 32,000×8 bits of storage sufficient for combining all external RAM requirements of those References in one System 10). Further, with respect to any word where that determination has indicated extensive use of the particular word, COUNT Control 902 also provides for alerting the typist when the particular word is identical to a root word in List 904. For this purpose, a ROM (Read-only Memory) unit 52 in Typewriter 10 stores a Spelling Dictionary 906 identical to Dictionary 56 disclosed in Reference I except for addition of a discrete Special Code 907 identifying each word which is also present in List 904 in much the same manner as described for the Word-Alert TM Feature 800 in Reference VI. In this respect, it may be mentioned that the Word-Alert special code and address codes can be present in addition to Special Code 907.

Figure 1:
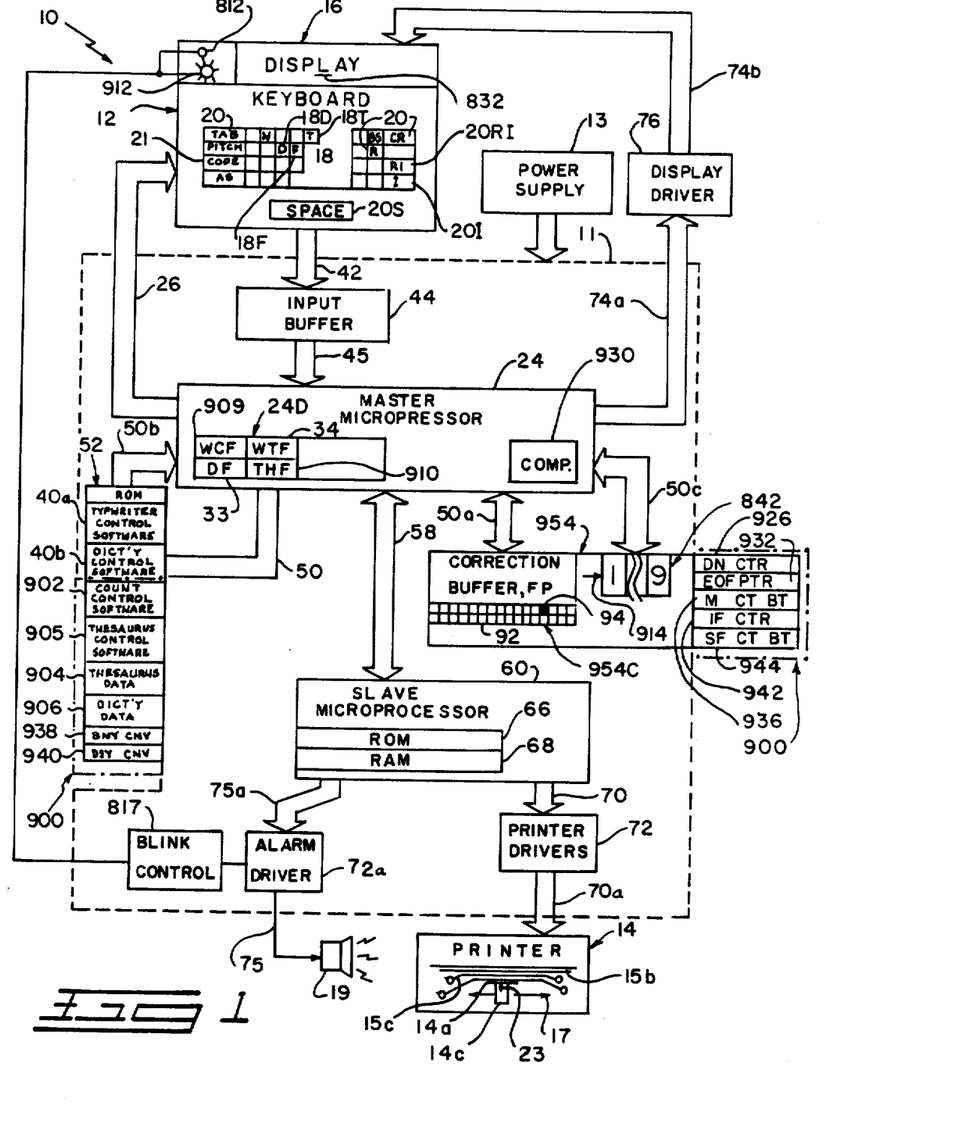
FIG. 1 shows a block diagram of an electronic typewriter with an editable memory, a full-page correction buffer clearable upon command; and, according to the invention, apparatus for scanning the editable memory, storing each differentiable word of the editable memory in the cleared correction buffer together with a count of each usage thereof. Each pressing of a particular key on the typewriter's keyboard controls successive display, in descending order of frequency, of each of the most frequently used ones of the words and its corresponding frequency of use

The four principal units 11, 12, 14 and 16 of FIG. 1 interact in the usual fashion, manual selection of any desired typewriter operation being made at Keyboard 12. Printer unit 14 and/or Display 16 are operated under control of Electronic Circuit 11 for accomplishing the function selected by a keyboard input—for example, printing and/or displaying a character corresponding to a character key 18 selected by the typist or corresponding to a character of a word supplied by a word-by-word reading of a selected one of the files in Editable Memory 842 or to a synonym found by matching an argument word of Thesaurus List 904.

Keyboard 12 contains the usual plurality of Character Keys 18, Carrier Control Function Keys 20 (including Return 20R, Backspace 20B, Index 20I, Reverse Index 20RI, Spacebar 20S, etc.) and a "Code" Key 21 (always operated in conjunction with one of the keys 18 or 20). Code Key 21 serves to select an operative mode of System 10, such as the "Dictionary" mode previously disclosed in Reference I, "Thesaurus Search" mode detailed in Reference VII, but only described briefly herein; and the "COUNT" mode 900 described subsequently.

Upon depressing any one of the various keys on Keyboard 12, a respective keyboard output signal is communicated to Electronic Control Circuit 11, the outputs of which control functions and operations of Typewriter 10. Mainly, these operations relate to the various components of an impact Printer 14—namely, a Platen 15a supporting a Document 15, and a Carrier 14c which holds a Print Wheel 14a. Characters formed on Print Wheel 14a are rotatable into alignment with a Print Hammer 23 for application of data to Document 15 or subsequent removal of same by selective use of an Inked Ribbon 15c or a Correction Ribbon 15b, as is known. Carrier 14c is mounted on Typewriter 10 for left and right horizontal movement along Platen 15a (as indicated by arrowheads 17) in bidirectional printing as well as normal printing with return to the left margin.

The block diagram of FIG. 1 provides an overall view of the Control Circuitry 11 used for implementing the COUNT feature 900. A Power Supply 13 is connected to provide the electric power necessary to operate the various electronic components in control circuitry 11. As shown in FIG. 1, system operation is controlled here by communication between Keyboard 12 and a Master Microprocessor 24 (located within Circuit 11 and being a known electronic component such as the 8031 made by Intel Corporation of Santa Clara, Calif.). This communication occurs by use of an equally well-known interrupt technique issued periodically (e.g. every 7 milliseconds) on Bus Lines 26. As a result of the interrupt, Keyboard 12 (more particularly, a matrix arrangement of keyboard switches—not shown, but known) is scanned to detect actuation of any key 18, 20, etc. A logic code signal representative of the key actuated appears on Bus line 42 extending to an Input Buffer 44 (a Hex Non-Inverting buffer, such as a CD 4503 made by National Semiconductor Co. of Santa Clara). Keyboard signals are temporarily stored by Input Buffer 44 in order of keyboard entry. Master Microprocessor 24 receives data—in turn—from Input Buffer 44 via Bus Line 45.

Master Microprocessor 24 typically has various electronic control elements including a known Status RAM 24D which provides temporary storage of presently active information—e.g., a plurality of flags (known single-bit, two-state memory units) periodically interrogated as part of the system's program routine. Flags relevant to the invention include—among others discussed herein—a Dictionary Flag 33, a COUNT Flag 909 indicating activation of the COUNT feature 900 to determine the extent of repetitive use of words after forward (or backward) scanning of text in Editable File Memory 842 (referred to more simply as "File Memory" 842 hereinafter) as will be described. Other known flags may also be present for purposes of particular activities relevant to COUNT, as will be seen.

Master Microprocessor 24 is associated with external electronics including ROM unit 52 for controlling Master Microprocessor 24. ROM unit 52 contains Typewriter Control Software 40a, Dictionary Control Software 40b, and COUNT feature 900, this last having not only the corresponding Control Software 902 and, preferably, a Thesaurus List 904 containing root words and their synonyms, but also a special set of Dictionary Data 906, as mentioned earlier. That set 906 comprises character codes forming a list of properly-spelled words ordinarily used (per Reference I) to verify the spelling order of characters upon release of printer decode signals from the RAM area 954 described earlier. According to the invention, however, Dictionary 906 also has a Special Code 907 (see FIG. 2) identifying each word which is a root word and thus has at least one synonym therefor stored in List 904. Special Code 907 follows the last character (e.g. 911 in FIG. 2) of the word duplicated in List 904 or the last Bit Map address code (not shown in FIG. 2) of Word-Alert feature of Reference VI when that feature is also provided in System 10.

As also seen in FIG. 1, character and control code signals appear on a Bus Line 50 connected to ROM 52 (Read-Only Memory). In response, ROM 52 sends data and control signals to Master Microprocessor 24 via Bus Line 50b. In the instance of pressing a printable symbol Key 18, for example, the printer code signals are sent to RAM 954 for storage, this last including a portion serving as a Correction Buffer 954C (as it will be termed hereinafter) and storing a full page of text characters, as stated earlier. As used herein, the term "Full-Page" signifies enough bytes to store text from an 8½ by 11 page with customary margins, but densely packed character spacing and linespacing—i.e., about 60 lines of 100 characters (15 pitch). ROM 52 may also include program instructions for other features disclosed in References II-V.

Correction Buffer 954C operatively associated with Master Microprocessor 24 comprises a stack of about 6000 memory bytes 92 (occupying another portion of RAM 954, a static IC as mentioned earlier and being available commercially from Sharp, Inc. under the designation "81256") hitherto used only for storing coded information as to characters selected at Keyboard 12 and processed by Microprocessor 24. Correction Buffer 954C is addressable by a Display Cursor 832 (shown as an underline in Display 16) coordinated with a Pointer 94 (shown solid in FIG. 1). In Typewriter Mode, Pointer 94 is located at a byte position corresponding to the current columnar position of Carrier 14c and the vertical position relative to the first printed line of Document 15, such that the character previously entered at that columnar position of Carrier 14c and any line on Document 15 can be recalled from Full-Page Correction Buffer 954C for purposes of correcting printed text, as is known. According to the present invention, however, Pointer 94 is also controllable by data developed while scanning a selected file of Memory and by frequency-of-use data stored in Correction Buffer 954C, as will be explained.

Character code signals ready for printer processing are sent along the line 58 (output channel) from Master Microprocessor 24 to a further Microprocessor 60 which is slaved to Microprocessor 24 as master. Slave Microprocessor 60 (e.g. the 8051 also made by Intel and identical to the 8031 except for program memory) has its program stored internally in a ROM 66 (4K × 8 bits), the code data being stored internally in a RAM 68 (128 × 8 bits). Code data are read as they are needed by the program in ROM 66 in order to develop, in known fashion, control and drive signals to operate the various elements of Printer 14 (via lines 70, 70a and Printer Drivers 72). Similarly, Display Drivers 76 connected to Master Microprocessor 24 by lines 74a serve to operate Display 16 (via lines 74b) for visually presenting the last plurality of character inputs in known fashion. Display 16 may be operated in conjunction with or independently of Printer 14 and is also used herein for presenting the words and counts of overused words, as will be described shortly.

At this point, it should be explained that System 10 normally operates in one of three modes: Typewriter Mode, Line Mode and Memory Mode. In the first of these modes, System 10 behaves like a normal typewriter, characters being printed on Document 15 (or "Sheet 15" as it will be termed hereinafter for simplicity) simultaneously stored in Correction Buffer 954C as they are entered on Keyboard 12. Then, if System 10 is in Spell Mode and Word-Alert feature 800 has also been activated, and an original word is misspelled, mistyped or misused, pressing of A-S Key 302 and Index Key 201 thereafter presents, in turn, successive alternatives on Display 16. When an alternative seen on Display 16 is deemed suitable, the typist can press Return key 20R and cause Printer 14 to replace the original word on Sheet 15 automatically with the suitable alternative.

The alternative word also replaces the original one in Correction Buffer 954C.

In Line Mode or Memory Mode, System 10 functions in the same manner as in Typewriter Mode except for printing since corresponding text does not appear on Sheet 15 during these two modes until Return Key 20R or the like has been pressed after the selected program has ended. Pressing A-S Key 302 or Index Key 20I merely deletes the original word from a Line Buffer (not shown, but also a known part of RAM 954) via Line Mode or from File Memory 842, respectively, depending on that mode which has been selected by a "Mode Switch" (also not shown, but may be a known slide switch, for example). Next, the replacement word is automatically inserted in place of the original in the respective part of memory and Display 16 of FIG. 1 in known fashion.

To review, according to the present invention the "Word Counter"given file in File Memory 842 [e.g., 842-1 selected by pressing the numeral "1" key (not shown) of Keyboard 12 or in any other fashion—rotary switches, slide switches, etc.] so as to permit identification of overused words in that file. This feature applies, as mentioned earlier, only to text stored in Memory 842—i.e., by entry of characters via Keyboard 12 while System 10 is in Memory Mode. Program 902 for counting words in the selected text depends on utilization of the afore-mentioned Full-Page Correction Buffer 954C. The data in Buffer 954C are redundant when System 10 is in Memory Mode and Keyboard 12 is interacting with File Memory 842. Data in Correction Buffer 954C are not redundant when System 10 is in Typewriter Mode. Data in the above-mentioned line buffer (not shown) used in Line Mode are also redundant, but one line of characters is obviously insufficient for Word Counter or "COUNT" Feature 900 (as it will be termed hereinafter for simplicity). Note that activating COUNT Feature 900 must first erase the contents of Full-Page Correction Buffer 954C. Hitherto, the contents of Correction Buffer 954C remained undisturbed unless Power Supply 13 of System 10 was turned off or a known automatic paper insertion feature was activated. Accordingly, a third condition for erasure of Correction Buffer 954C is the activation of COUNT Feature 900.

A general overview with respect to Feature 900 now follows. Activation is effected by holding down Code Key 21 while pressing the "W" Key 18W (the "W" key also bearing the label "Count" to show its alternate utilization as a feature control when pressed in conjunction with Code Key 21). A "beep" (a steady audible signal) is emitted by Alarm 19 to indicate in a known manner the activation of Feature 900. COUNT Program 902 then determines the extent of usage of each word scanned in the text, from the point where Cursor 832 is located relative to the text in Display 16, and then forward throughout the text, except for a possible initial return to the beginning of the word if the typist activates Program 902 at midword. If Cursor 832 is positioned at the beginning of the file, Count Program 902 scans the entire file in the forward direction, counting any repetitions of each word therein. On the other hand, if Cursor 832 is at the very end of the file, Program 902 begins scanning backward to identify each word and count repetitions of each word from the end of text to the beginning of the file. Program 902 covers the entire contents or the defined portion of the selected file in File Memory 842, storing each discrete word and a related frequency count in Correction Buffer 954C. Then it displays a message indicating completion of the counting activity—e.g., "Count Complete."

The frequency counts are then compared automatically with one another to determine the highest one, following which that count and the corresponding word from the selected file in Memory 842 are presented on Display 16, the count precedinq the word and being separated from the latter by a space or two. If several words were used with the same frequency, upon successive pressings of Index Key 20I, each differentiable word is displayed in the order of first entry in the text. Other frequently-used words are then displayable in decreasing order of usage, i.e. a word counted 19 times preceding a word used just 18 times, say. Preferably, the only words displayable are associated with the 20 highest frequencies of use in the text scanned, the most frequently used word being presented first and automatically, as mentioned above. To see consecutive ones of the other overused words (beginning with the word used next-most often), the typist simply presses Index Key 20I to display the next word in manner similar to that disclosed in References II-VI with respect to trial words, confusable words, etc. On pressing Key 20I when no further words are qualified, Display 16 is caused to prompt an advisory message such as "End of List" in known fashion. If review of these words is desired at that point (or at any earlier point), the typist presses Reverse Index Key 20RI to present them in reverse succession to the sequence in which they were previously presented, again in the manner disclosed in References II-VI.

Preferably, a Thesaurus List 904 (root word thesaurus only) is also stored in ROM 52 and if the overused word present on Display 16 is in that Thesaurus List, a Thesaurus LED 912 starts to blink. This signals the typist that Thesaurus List 904 can be used in finding a synonym suitable for replacement of the overused word at appropriate points in the text. If the typist wants to look up synonyms of a signalled one of the overused words, a Thesaurus Program 905 is activated by pressing Code Key 21 plus the "T" Key 18T while that overused word is present on Display 16. Thesaurus List 904 is then searched for the matching word and its synonyms, the synonyms being presented on Display 16 along with the overused word when the match is made.

To resume display of further ones of the overused words, Thesaurus Program 905 is deactivated by a repeat pressing of Code Key 21 plus Key 18T. COUNT Program 902 then being capable of successively displaying others of the most-used words up to the previously-mentioned maximum of 20 upon each renewed pressing of Index Key 20I (the number of pressings not necessarily being limited to 20 because several words may have the same frequency of use, as will be seen).

It may be noted that in Word Count Mode, if a synonym is more suitable than the original word, pressing Return Key 20R must not cause substitution of the synonym for the original word in File Memory 842. The reason for this is that Program 902 cannot tell which locations of a repeated use of the original word are more appropriate for a replacement. Consequently, for that exchange to be made in the selected file, the typist must jot down or remember the selected synonyms and use a known "Search and Replace" routine to replace various ones of the overused words at their different locations in the file scanned (e.g., File 842-1).

Turning now to a detailed description of the invention, it is postulated, to begin with, that the typist has completed entry of information into a selected file in Memory 842 (the first file 842-1 for purposes of this description) and wishes primarily to discover the words most frequently used and how often they were used. The typist then has a basis for a decision as to overuse. Further, if that decision is "yes", a quick scan of relevant synonyms would be quite useful. A call upon Thesaurus List 904 of root words and their synonyms would be a waste of time, though, if the actual word were not one of the root words in List 904. Accordingly, Dictionary Data 906 include codes relevant to the present feature, as stated earlier, so it will be postulated for description of this embodiment that the "Spell" feature of References I and III has also been activated, as would be the usual case. Note though, that joint activation is not actually necessary, the checking routines in Dictionary Program 40b being accessible to COUNT Control 902 in fashion substantially identical to that disclosed in Reference I and simplified somewhat in References II-VI, except for being dependent upon the intervention of COUNT Control 902. It follows, then, that Dictionary Flag 33 has likewise been set to a ONE and LED 812 turned ON to indicate activation of the SPELL feature.

As previously mentioned, COUNT feature 900 must first be activated by pressing Code Key 21 and holding it down momentarily while "W" Key 18W is pressed. This action develops a code signal causing (1) the above-mentioned setting of COUNT Flag 909 to a ONE, (2) emission of a "beep" by Alarm Device 19 to indicate in a known fashion the acceptance of the command, and lastly, (3) automatic clearance of Correction Buffer 954C.

COUNT Control 902 begins by scanning the selected text starting with the word in the text designated by a File Pointer 914 which can be located anywhere in the file when COUNT Feature 900 is activated, but is coordinated with the position of Cursor 832 relative to that text in Display 16. If Cursor 832 is at an intermediate point in the designated word, Program 902 causes that word to be scanned backwards in known fashion with decrementation of File Pointer 914 at each byte, until the beginning of the word is detected (a space code, generally, although the code could be any other code denoting the end of the previous word or could also be a code denoting the beginning of the file). In any event, upon finding such a code, File Pointer 914 is incremented to point to the first character of the word. That character is then read and stored in the first byte 741 of a Template Register 704, following which a Character Counter 918 is incremented by unity to indicate an entry and to point to the next byte of Template Register 704. File pointer 914 is likewise incremented to point to the next (second) byte of the first word in File 842-1. After a check of the contents of that byte for a space code or other "End-of-Word" code (punctuation or the like, as is known), the character code in that byte is likewise stored in Template Register 704, but this time in the second Byte 742 in accordance with the stepped-up value in Character Counter 918. Following this, both Character Counter 918 and File Pointer 914 are again incremented, and the process repeated until another "End of Word" (EOW) code is found. When such a code is detected (in known fashion) as the next character, File Pointer 914 is incremented, but Character Counter 918 is not. Program 902 now moves to a different phase—namely, transfer of the first word to Correction Buffer 954C.

Figures 3, 4:
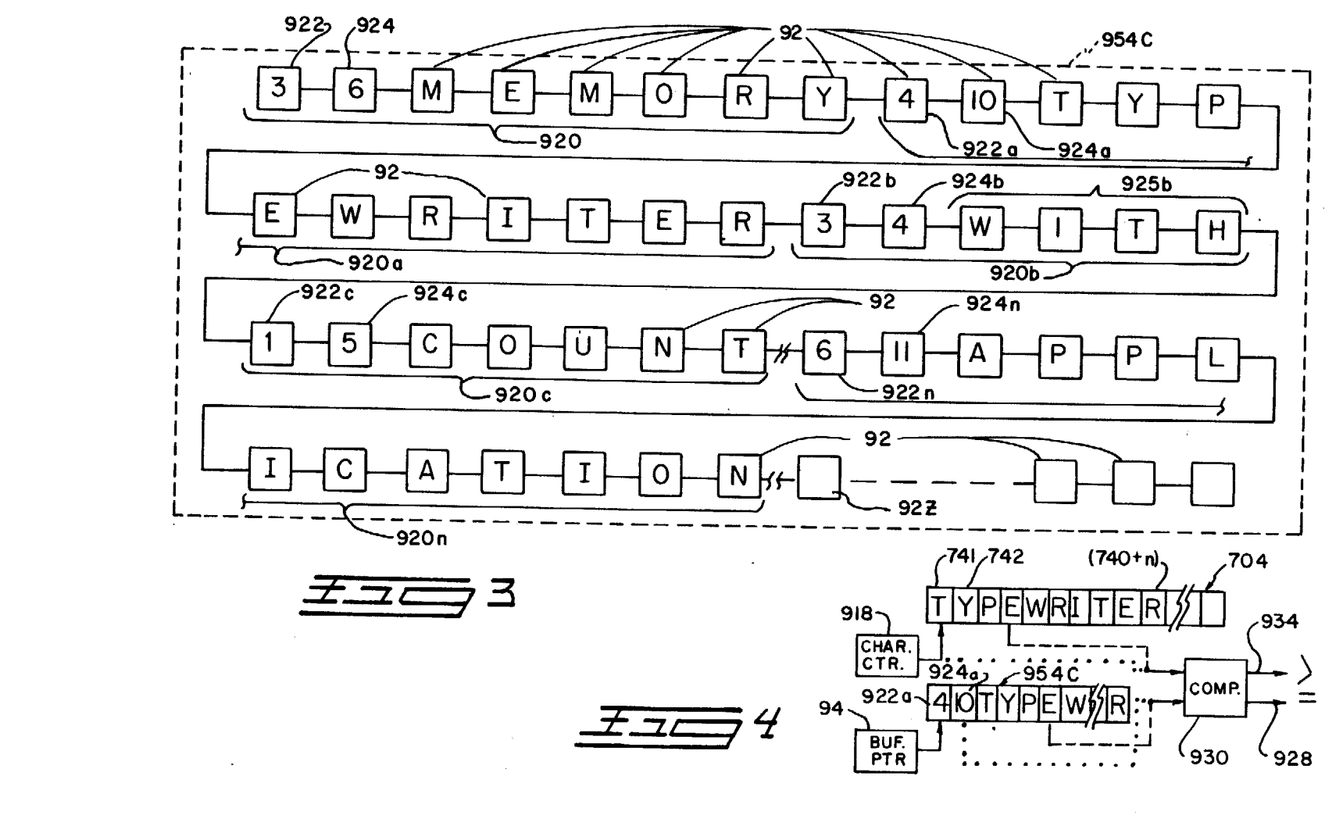
FIG. 3 is a schematic diagram showing the arrangement of the stored counts, number of characters in the word, and the word itself, in the correction buffer of FIG. 1.
FIG. 4 is a schematic diagram showing a register for storing a word read character-by-character from a selected file memory, and a counter determining the number of characters as they are stored; together with a comparator for determining equality with the character count of successive words in the correction buffer of FIG. 1.

As shown in FIG. 3, the information stored in Correction Buffer 954C as to the words scanned in File Memory 842-1 (arbitrarily selected on the basis of the first page of the present application, as an example) is arranged in variable-length Sets 920-920n consisting of three fields: two single-byte fields and a variable length "word" field. A first byte 922 stores a binary coded numeral indicating the number of times that a given differentiable word has been encountered in the text. A second, contiguous byte 924 stores another numeral code (again binary) corresponding to the number of characters in the word. The remaining field of each Set 920-920n stores the characters of the given word read from the text of File 842-1 (first page of the present application for purposes of this description, as just mentioned). Thus, as seen in FIG. 3, the very first byte 922 of Set 920 contains the numeral "3" for the three times that the word "memory" appears on the first page of this application. Byte 924, on the other hand, as the second byte of Set 920 thus stores a "6" for the number of characters in memory. The next six bytes 92 of Set 920 store the characters forming the word "memory."

The second word (in the title) is "Typewriter", which is used four times in the first page, thus accounting for the numeral "4"stored in Byte 922a (suffixes after the byte designation conform to the corresponding designation in Buffer 954C) and the ten characters of this second word in File 842-1 accounting for the "10 " in Byte 924. The ten characters of the word are then stored in the following ten bytes of this second Set 920a. The third and fourth words are "with" and "count," which have frequencies of use of three times and once, respectively, and contain four and five characters, again respectively, as is verifiable by inspection of page 1. Thereafter, FIG. 3 skips to the n-th word "application"- which is used 6 times (the word "applications" being differentiable and counted separately) and contains 11 letters. In summary, each Set 920 has a length corresponding to the numeral code in Byte 924 (number of characters in the word) plus 2. Set 920n for the word "application" thus has a length of 13 bytes, for example.

Reverting now to the entry of successive words into Correction Buffer 954C according to the above-defined structure, that entry is implemented as follows. First, a check is made of the content of the first byte 92 of Buffer 954C. If blank (ZERO), then the process of entry has just begun—recalling that Buffer 954C was cleared initially. Accordingly, First Byte 922—being at the starting location of Buffer 954C and that location having been set into Buffer Pointer 94 (FIG. 1) during the previously-mentioned initialization—is incremented to give a count of "1," the value in Character Counter 918 (FIG. 4) is transferred to Byte 94 (by a known addition, say) after incrementing Buffer Pointer 94 to designate the second byte of Buffer 954C. Then, the characters of the first word read into Template Register 704 at bytes 741-746 (for the particular text chosen as an example) thereof are transferred into the third through ninth bytes of Buffer 954C. The transfers are effected under control of a Down Counter 926, which is set to the value in Character Counter 918 for that purpose. The transition of Down Counter 926 to ZERO indicates completion of the transfer, the setting in Counter 926 being decremented after each transfer of a character. Buffer Pointer 94 is incremented at the same time, of course, to designate the next byte of Buffer 954C as the storage position.

When Down Counter 926 is detected as being at ZERO, the second phase is over and scanning of File 842-1 for another word must begin again. Therefore, Buffer Pointer 94 is reset to the starting address of Buffer 954C while Template Register 704 is cleared and Character Counter 918 set to a "ONE" to designate the first byte 741 of Register 704 as the place for storage of the first character. If the next character pointed to by File Pointer 914 is another EOW code (space, punctuation, etc) File Pointer 914 is merely incremented. When the next character in File 842-1 is a valid one (numbers and symbols are stepped over in the same fashion as EOW codes), it is stored in the First Byte 741 of Template Register 704 whereas File Pointer 914 and Character Counter 918 are incremented and the further characters of a word stored in bytes 742, . . . (740+n), the numeral in Character Counter 918 therefore being "n". The process is repeated until a succeeding EOW Code is detected. At that point, the second phase of activity (entry of the next word into Buffer 954C for counting purposes) begins anew.

As will be recalled, Buffer Pointer 94 was reset to the starting address of Correction Buffer 954C at the end of the previous second phase. Consequently, Pointer 94 now indicates the first byte 922 of the first Set 920. That byte 922 having been incremented to a count of "1", when byte 922 is tested for a blank the non-zero result indicates that at least one word has been stored. Because this second word might be a duplicate, Buffer Pointer 94 is incremented to designate byte 924 and the length of the new word (value "n" in Character Counter 918) is compared with the numeral in the second byte 924 (see FIG. 4, dotted lines). If the output on line 928 from a Comparator 930 is Zero (low or FALSE), the length of the second word ("typewriter" in this example) differs from that of the preceding word ("memory") and they are clearly dissimilar without further ado. Hence, the value in Character Counter 918 is added to Buffer Pointer 94 to jump it to the end of Set 920 and it is incremented once more to point to the next byte 92 of Correction Buffer 954C.

On the other hand, if the level on the "Equals" output line 928 is a "ONE" (high or TRUE), then a character-by-character comparison (dashed lines in FIG. 4) must be made in known fashion to distinguish more finely between superficially similar words. In this latter round of comparisons agreement of all characters indicates repeated use, so the address in Buffer Pointer 94 is decreased by the value in Character Counter 918 and decremented by two units more to point to the Frequency-of-use Byte 922, the content of which would then be incremented to indicate a repeated use (which it is not in the present examples ). Conversely, a Zero (low or FALSE) on comparing a corresponding pair of characters immediately results in addition of the value in Character Counter 918 to that in Buffer Pointer 94 and a further incrementation of this last likewise causes it to point to the Byte 92 of Buffer 954C following the last character of Set 920. That Byte 92 is blank at this time ("Memory" having been the first word entered and "typewriter" being the second, as yet unentered word). That blank Byte 92 becomes the First Byte 922a of a second Set (920a) by being incremented to a count of "1". Buffer Pointer 94 is also incremented, thus pointing to Byte 924a, which then receives the value 10 from Character Counter 918. Next, Buffer Pointer 94 is incremented again to begin transfer of the ten characters of the word "typewriter" under control of Down Counter 928, just as explained before. Transition of this last to Zero after transfer of the last character (740+n, where n=10 for the word "typewriter") is followed, of course, by resetting Buffer Pointer 94 to the starting address of Buffer 954C, by clearing Template Register 704, and setting Character Counter 918 to the count of "1", all in preparation for reading the next and further words of text in File 842-1 (e g. "with", "count,". . . "application" . . .). The above-described pair of phases are applied until the address in File Pointer 914 reaches a value equal to that stored in an "End-of-File" (EOF) Pointer 932 which saved the address of the ultimate byte in File 842-1 in known fashion when this file was closed after the last editing.

At this point, a third phase is begun which is directed to finding the most-used word in the text of selected file 842-1. To this end, what may be termed a "Get Max" operation is followed. Get Max comprises comparison of the count in each of the successive first bytes 922, 922a. . . 922N (where N designates the last Set in the sequence). Each of the bytes is first compared for equality with Zero (blank) to ensure that the last of the Sets (920N) has not been passed, as further magnitude comparisons would then be futile. So long as the output on Line 928 of Comparator 930 is low on comparison with Zero, the count data in at least one more Byte 922N must be considered.

The count in a given Byte 922n is then compared with that in the succeeding Byte 922(n+1) for magnitude and, if larger (output on Line 934 of Comparator 930 being a One or high), is stored in a Max Count Byte 936 and then compared with the following Byte 922(n+2), etc. until the test fails—e.g., the count in a following Byte 922(n+5), say, is the larger, the output on Line 934 thus being a Zero or low. The count in the latter Byte 922(n+5) is then written over the previous value in Max Count Byte 936 and the count in 922(n+5) then compared in turn with the count in the following Bytes 922(n+6), etc., which—when Line 934 is at Zero—is again written over the value in Max Count Byte 936 and compared with any further Bytes 922n in the manner described. The value standing in Max Count Byte 936 is therefore the maximum when the Byte 92 following the last Set 920N is compared with Zero and a "1" on Line 930 shows an equality exists. As a consequence, Display 16 shows "Count Complete" and Program 902 then causes the value in Max Count Byte 936 to be converted from binary code into three corresponding digits in matrix code applicable to Display 16 using a known Binary-to-Matrix Code Converter 938 in common fashion. These digits are then displayed (arbitrarily) in the first three positions of Display 16. Next, Program 902 initiates a new scan of Correction Buffer 954C as of its origin, while comparing the First Byte 922 of each Set 920 with the value stored in Max Count Byte 936. The reason for this new scan is to locate the most overused word so as to display that word with the related count.

To this end, upon detection of a match in the counts (high or "ONE" output on Line 928), Buffer Pointer 94 is incremented, the designated Byte 924 is read and set into Down Counter 926 for .control of read out, of the overused word and transfer into a display buffer register, preferably the LUD Register 218 of References II-V and VI. (If Word-Alert feature 800 is included in System 10, capacity of LUD Register 218 is preferably 400 characters because of length of data related to each argument word in Word-Alert List 804 and Thesaurus List 904). The characters in LUD Register 218 are then converted into matrix code from the Daisy position code in which they are stored, by similar use of a known Daisy position-to-matrix Converter 940.

After presentation of the "most overused" word on Display 16, the typist may wish to see further overused words. Pressing the Index Key 20I a first time in the Word Count operation causes a continued scan for a match with the value in Max Count Byte 936. The reason for this continued scan with respect to Max Count Byte 936 is that the search for the maximum count did not reveal whether any other words had that same frequency-of-use (a distinct possibility) and were thus equally worthy of presentation for consideration at that time, it being recalled that the Sets 920, 920a, etc. are developed in order of first appearance of a given word in the text of File 842-1. If the comparison in Comparator 930 results in a low output on Line 928, the Counts do not match, hence Buffer Pointer 94 is incremented in the manner previously described so as to designate the next First Byte 922, and the comparisons with Zero and with Max Count Byte 936 are repeated. On each match of the count values, the value in Max Count Byte 936 is again converted from binary into three decimal digits in matrix code and presented in the first three positions of Display 16, as explained above. Then the Character count from the adjoining Byte 924n is set into Down Counter 926 and the appropriate characters of Set 920n are likewise converted to matrix code and presented in Display 16 beginning with the fifth position, again as explained above. Furthermore, an Identical Frequency Counter 942 is incremented for purposes of review, as will be seen shortly.

If Index Key 20I is pressed once more, the scan for a Byte 922n producing a further match with the value in Max Count Byte 936 is resumed—with an initial check, course—for the Zero indicating the last Set 920N was just scanned. Each time a match is found, the value in Byte 922 and the characters of the related word are again converted into matrix code and presented in their appropriate locations in Display 16, and Identical Frequency Counter 942 is again incremented. When a Zero in Byte 92Z is found upon pressing Index Key 20I, there are no more words in the Set 920n having a frequency-of-use value in any of the related Bytes 922n identical to that in Max Count Byte 936. Hence Buffer Counter 94 is reset to the initial address of Correction Buffer 954C and the value in Max Count Byte 936 is read, decremented and stored in a Saved Frequency Count Byte 944. Then the decremented value in Byte 944 is compared for equality with Bytes 922, 922a . . . 922N. If a match is found, that decremented count and the associated word are presented in Display 16 in the manner described in the foregoing. If a match is not found, however, the value in Saved Frequency Byte 944 is decremented and comparison for a Zero or an equality is repeated.

Each renewed pressing of Index Key 20I again raises the possibility of counts in Bytes 922n being identical so a continued scan for matchings of the decremented value in Saved Frequency Count byte 944 is performed in like manner to that just described. The Identical Frequency Counter 942 (cleared at the same time that Buffer Pointer 94 was reset to the initial address) is incremented at each matching, just as before. In this fashion, words associated with up to 20 different frequency counts may be presented individually in Display 16.

As mentioned earlier, the purpose of Identical Frequency Counter 942 is to permit review in reverse sequence of the words and counts previously presented, particularly where the same frequency-of-use value existed for several different words. Should the typist desire such a review of words presented, Reverse Index Key 20RI is pressed and if there is a non-zero value in Identical Frequency Counter 942, that value is decremented, entered into Down-Counter 926 (or an equivalent) and each Byte 922n in Correction Buffer 954C compared for equality with the value in Max Count Byte 936 (or in Saved Frequency Count Byte 944, as the case may be), Down Counter 926 being decremented as each matching is found. When transition to Zero occurs, the previous word with the same frequency-of-use value has been located and is therefore read into LUD Register 218 for presentation in Display 16. This process is repeated at each pressing of Reverse Index Key 20RI until the value in Identical Frequency Counter 942 becomes Zero. At that point, the Saved Frequency Count Byte 944 is incremented and a search for a Byte 922n with that new value is instituted in the fashion described in the foregoing.

As stated earlier, according to the present invention, Count Control 902 detects transfer of a word identical to a root word in Thesaurus List 904 (or any of the commonly-confused words of Word-Alert List 804 if that feature is also present in System 10). For this purpose, Dictionary Data 906 include a Special Code 907 relevant to Thesaurus Feature 950. Hence, when Word Count Feature 900 is active, after a word with a high frequency-of-use value has been located in Correction Buffer 954C, as previously explained, and is being transferred to LUD Register 218 for display along with that value, as each character of the word is entered into Register 218, a path is traced into the three Dictionary tables 78, 80, and 82 and Tree Structure 84 of FIG. 2. Normally, the word entered is spelled properly, any errors having been corrected in response to an error signal via Device 19 and LED 812 during entry into File Memory 842-1, so LED 812 will not blink under these conditions.

Code 907 follows after the last character of a complete word (e.g., the "Y" Character 911 in the word "memory" of FIG. 2 as the first word of the example chosen in FIG. 3) and identifies that word as also being present in the Thesaurus List 904. Detection of the SC Code 907 indicates the typist may need alerting to presence of the same word as a "root" word in List 904. Consequently, Thesaurus Flag (THF) 910 is tentatively set to a ONE. Because Dictionary 906 is arranged to share portions of words in common, the ONE state of Flag 910 cannot be effective immediately. That follows because the word being read from Correction Buffer 954C may have additional characters.

Figure 2:
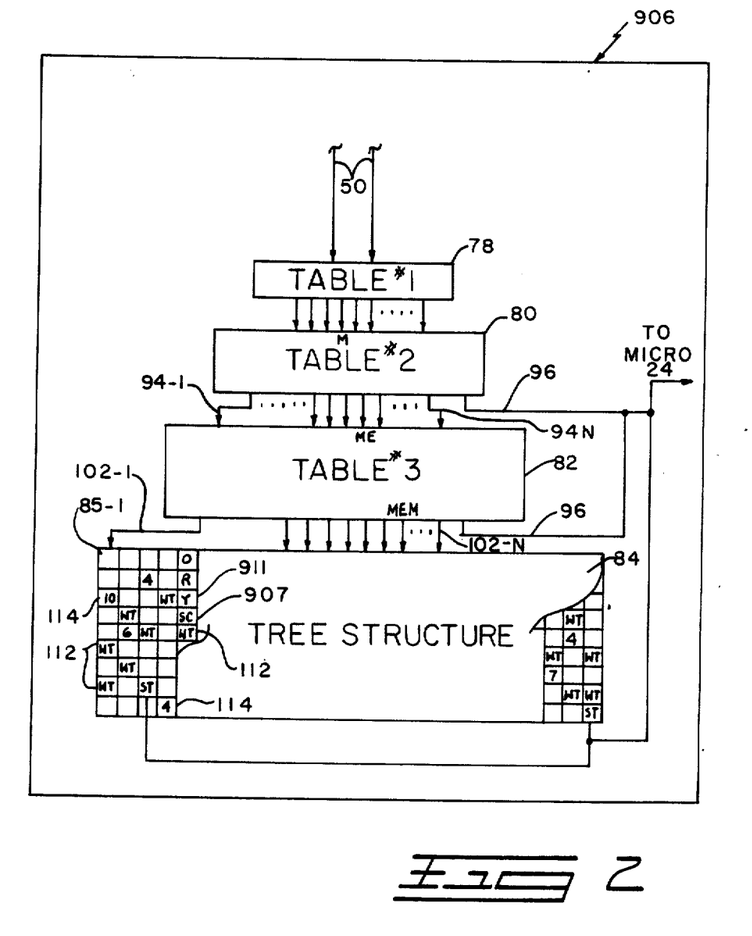
FIG. 2 is a block diagram showing the memory arrangement of the modified stored dictionary providing indication of availability of a synonym in an associated thesaurus listing upon display of a given word and its usage count.

As seen in FIG. 2, Code 907 in known fashion, is followed by a Word Terminator Code 112 or a Numeral Code 114 which indicate the end of a word or the possible continuation to the additional characters of a longer word, respectively. The routines of Dictionary Control Software 406 include a prescan of each next character (as described in References I and III). In response to the prescan of a Code 112 or 114, the WT Flag 34 is set to a ONE also. In Count Mode, transition of Down Counter 926 to Zero after transfer of the last character of an overused word from Correction Buffer 954C to LUD Register 218, sets EOW Flag 35 to ONE confirming the previous setting of EWF Flag 34. The ONE state of Flags 34, 35 and 910 in conjunction causes Thesaurus LED 912 to be turned ON intermittently in a cyle determined by Blink Control 817.

On the other hand, if transfer of the previous character from Character Buffer 954C to LUD Register 218 is not accompanied by transition of Down Counter 926 to ZERO, then transfer of the word to LUD Register 218 is not complete and scanning of Dictionary List 906 to find another matching character is to continue. Hence, Thesaurus 910 Flag is immediately reset together with the WT Flag 34 previously set as tentative identification of an "End-of-Word".

Blinking of LED 912 (enabled by the ONE state of Flag 910 after a check of the state of EOW Flag 35) is achieved preferably by use of a cyclic counter (not shown, but a known software counter, for example, more fully described in Reference VI) stepped by the previously mentioned interrupt routine of Microprocessor 24. If the typist wishes to view the synonyms in response to this blinking signal, this function is implemented by pressing a particular key of Keyboard 12—either a dedicated key or preferably another combination of an alphabetic key 18, such as the "T" Key 18T with Code Key 21. Thesaurus Control 905 clears Display 16 and presents the overused word and at least one synonym instead of the original text. If none of the synonyms visible on Display 16 are deemed suitable, the display may be scrolled forward in a known manner by pressing Spacebar 20S. Each time this key is pressed, at least one new synonym for the particular word is shifted into Display 16 with loss of a comparable amount of information at the beginning of the display. If no further synonyms are available, the message "End of List" is displayed. For review of synonyms previously displayed, Backspace Key 20BS causes a reverse shift of the information with corresponding loss at the far end of the display, the immediately previous synonym being presented again.

Once the typist decides upon a particular synonym as the desired substitute, it is not sufficient to simply press the usual Return Key 20R and thereby replace the Overused Word 925 previously part of the text visible in Text 16. This is necessary because Count Control 902 cannot make a decision as to the particular locations where substitution of the synonym for the original word is preferable. Substitution at all locations is pointless. Therefore the normal response to pressing of Return Key 20R during a Thesaurus Search is inhibited in Count Mode, the Thesaurus Control Software 905 testing Count Flag 910 for a ONE and exiting the program when that condition is encountered.

While the foregoing indicates that the invention is applicable to a System 10 having a Spelling Dictionary 906 and a Thesaurus List 940, it should be noted again that it is applicable in conjunction with, say, the Word-Alert (TM) List of Confusable Words (Reference VI) or any other data-base providing a series of suitably arranged words exchangeable for a given original word. For ease and clarity of explanation, however, the description of the embodiment postulated presence of a modified Dictionary List 906 containing a Special Code 907 indicating availability of synonyms in the Thesaurus program 905 for replacing words undesirably used too frequently. The words are to be considered, therefore, as including misused commonly-confusable words replaceable by their alternatives.

We claim:

1. A word-processing system having a memory; character, format and control data input to the system through a keyboard with a plurality of alphanumeric and function keys depressible by an operator, and a display; in combination with at least one discrete file of editable text stored within said memory, said file containing a plurality of words, some of said words being identical to previous words in said plurality and others being differentiable relative to previous words therein; a correction buffer in said memory normally storing data entered through said keyboard and held for editing purposes, said correction buffer having a number of storage positions corresponding to a full-page of characters; address means for accessing said storage position in said correction buffer, sequence control means for producing first a cleared state of said correction buffer in response to pressing at least one of said depressible keys after processing each full-page; reading means operable subsequent to producing said cleared state and causing at least a portion of said plurality of words in the file to be read word-by-word, beginning with a first word in said full-page of characters in said correction buffer; writing means likewise responsive to producing said cleared state and operable under control of said address means to store in the correction buffer said first word read by said reading means; a first frequency-of-use count element associated with said first word and located in said correction buffer at a predetermined position relative to said first word stored therein, said writing means concomitantly entering an initial count of unity in said first frequency-of-use count element; means, including an identity output, operable for comparison thereafter of each next word successively read from said file with each word currently stored in said correction buffer, said means for comparison issuing said identity output when said next word is identical to a particular one of said currently stored words upon comparison therewith, and absence of issuance of the identity output after comparison of the next word with all words currently stored in the correction buffer indicating the next word to be a differentiable word, said writing means then storing said differentiable word in said correction buffer in association with a respective frequency-of-use count element located at said predefined position relative to the differentiable word, said writing means concomitantly entering an initial count of unity in said respective frequency-of-use count element; and incrementing means responsive to said identity output, said incrementing means augmenting the count by one in the frequency-of-use count element respectively associated with said particular one of the currently stored words and located at said predefined position relative thereto when said identity output is produced; whereby for each word in the correction buffer a count of the number of times the word is used within the full-page is maintained and a determination may be made as to whether any words stored in the correction buffer are overused.

2. The word processing system of claim 1, further including a thesaurus list of root words having at least one synonym for each said root word, and a second list of properly-spelled words together with marker means therein, presence of said marker means identifying discrete words of said second list as being duplicates of words in said thesaurus list of root words.

3. The word processing system of claim 2, further including signal means alerting said operator in response to said presence of said marker means.

4. The word processing system of claim 2, wherein said second list comprises a spelling dictionary and said marker means is a discrete code following the last character of each word in said second list duplicating a word in said thesaurus list.

5. The word processing system of claim 1, further including means for clearance of said display, a detector for sensing completion of reading said plurality of words from said file, said detector thereupon issuing a signal; magnitude means determining the relative number of counts in said respective frequency-of-use count elements, including a maximum count, said means for clearance and said magnitude means both operating in response to issuance of said signal, and means for automatically presenting in the cleared display thereafter said maximum count and the word in the correction buffer associated with the frequency-of-use count element containing the maximum count.

6. The word processing system of claim 5, wherein said maximum count is present in a given frequency-of-use element and the count value present in at least one other frequency-of-use element is equal to said maximum count; and additionally including a further discrete key on said keyboard, an Identical Frequency Counter, a Down Counter; means for comparing said maximum count with the count value in each said frequency-of-use element in response to the operator's pressing of said first discrete key, said means for comparing having an equals output and issuing said equals output when said count value in said at least one other frequency-of-use element is compared with the maximum count, means for clearing said display and presenting therein the maximum count and the differentiable word associated with the at least one other frequency-of-use element in response to issuance of the equals output, means incrementing said Identical Frequency Counter in response to issuance of the equals output; and means for reviewing previously displayed frequency-of-use values and associated differentiable words, said reviewing means operating in response to each pressing of said further discrete key by the operator and comprising means for detecting presence of a non-zero value in the Identical Frequency Counter, means for changing said non-zero value to a decremented value differing by unity in response to detection of said non-zero value, means for setting said decremented value in said Down Counter, and means for renewing an operation of said means for comparing, said Down Counter being decremented in response to each issuance of the equals output, and means responsive to transition of the Down Counter to zero for clearing said display and then presenting therein the maximum count and the differentiable word associated with the next previous element of the frequency-of-use elements containing a count value equal to the maximum count.

7. The word processing system of claim 5, further including means operable in response to pressing of a discrete other key on said keyboard by said operator for again activating said means for clearance of said display and for presenting in the again cleared display a next highest count contained in a given frequency-of-use count element, together with the word in the correction buffer associated with said given frequency-of-use count element.

8. The word processing system of claim 7, wherein said particular count is present in a given frequency-of-use element and the count value present in at least one other frequency-of-use element is equal to said particular count; and additionally including a further discrete key on said keyboard, an Identical Frequency Counter, a Down Counter; means for comparing said particular count with the count value in each said frequency-of-use element in response to the operator's pressing of said discrete other key, said means for comparing having an equals output and issuing said equals output when said count value in said at least one other frequency-of-use element is compared with the particular count, means for clearing said display and presenting therein the particular count and the differentiable word associated with the at least one other frequency-of-use element in response to issuance of the equals output, means incrementing said Identical Frequency Counter in response to issuance of the equals output; and means for reviewing previously displayed frequency-of-use values and associated differentiable words, said reviewing means operating in response to each pressing of said further discrete key by the operator and comprising means for detecting presence of a non-zero value in the Identical Frequency Counter, means for changing said non-zero value to a decremented value differing by unity in response to detection of said non-zero value, means for setting said decremented value in said Down Counter, and means for renewing an operation of said means for comparing, said Down Counter being decremented in response to each issuance of the equals output, and means responsive to transition of the Down Counter to zero for clearing said display and then presenting therein the particular count and the differentiable word associated with the next previous element of the frequency-of-use elements containing a count value equal to the particular count.

9. The word processing system of claim 1, wherein said correction buffer is divided into a plurality of bytes, and also including a further predefined relative position, a character count successively incremented upon reading each character of a next word from said file, said character counter being cleared prior to reading a first character of said next word and attaining a word-length value upon reading the last character thereof; and under control of said address means, including said word-length value in the character counter, said writing means store each character of the next word in successive bytes of the correction buffer, the frequency-of-use count element at said predefined relative position in reference to said successive bytes, and the word-length value in said further predefined relative position in reference to the successive bytes.

10. The word processing system of claim 9, wherein said frequency-of-use count element is a first particular byte, said word-length value is a character count "n" stored in the byte adjoining thereto, and said characters of a next word follow in said successive bytes, thereby forming a plurality of individual, random-length sets, there being N such sets each occupying n+2 bytes, and the Nth set being followed by a blank one of the bytes.

11. The word processing system of claim 9, further including blanking means initializing said correction buffer to a predetermined series of blank bytes as said cleared state, and blank byte detecting means; and wherein said predefined relative position for storing said respective frequency-of-use count element associated with each differentiable word upon a first reading thereof in said text is a first one of said blank bytes found by said detecting means following all words currently stored in said correction buffer, said further predefined relative position for storing said word-length value is a next one of the blank bytes, sand said characters follow in successive bytes thereafter.

12. The word processing system of claim 11, further including an adder and wherein said address means for locating discrete bytes of said correction buffer comprise a pointer cooperating selectively with said incrementing means and with said adder for summing an address in said pointer with said word-length value in the byte adjoining the frequency-of-use count element.

* * * * *